April 22, 1952     A. A. ROBBINS     2,593,797
FLOWER MOUNTING
Filed Dec. 7, 1945
*Fig.1.*
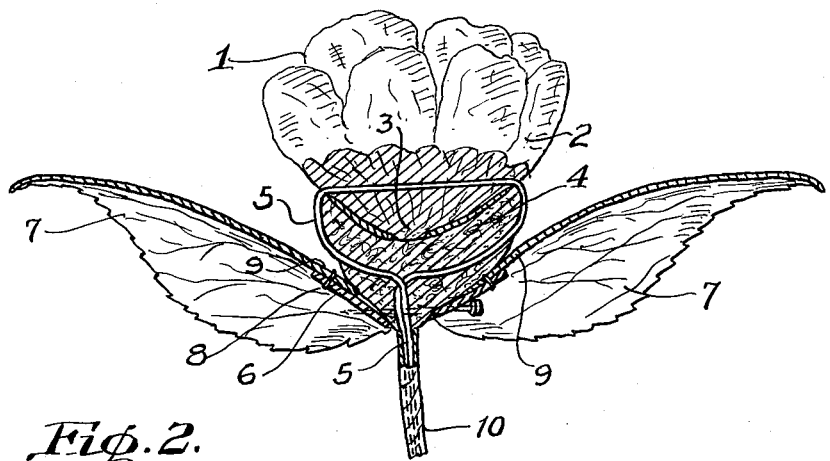
*Fig.2.*
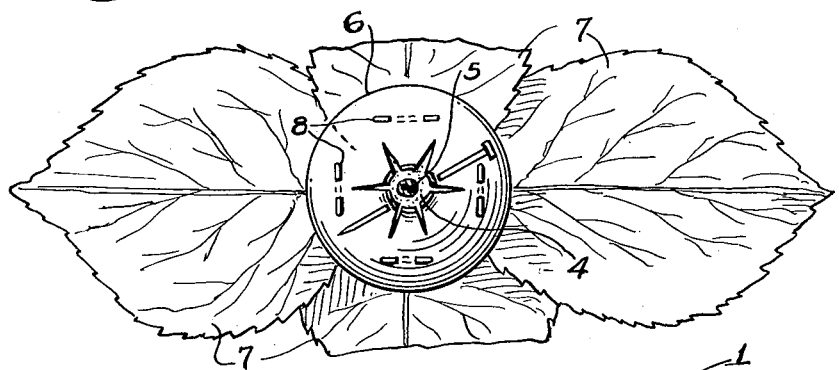
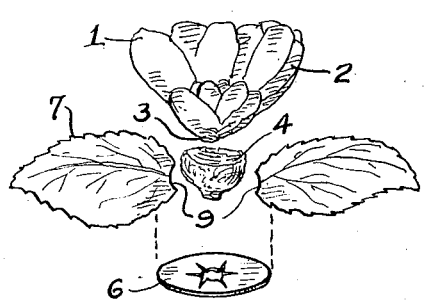
*Fig.4.*
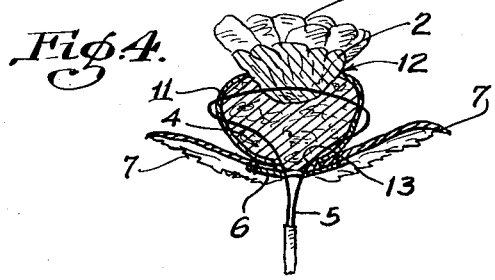
*Fig.3.*
INVENTOR.
Albert A. Robbins
BY
ATTORNEY.

Patented Apr. 22, 1952

2,593,797

UNITED STATES PATENT OFFICE 2,593,797

FLOWER MOUNTING

Albert A. Robbins, West Covina, Calif., assignor of one-tenth to Philip Subkow, Los Angeles, Calif.

Application December 7, 1945, Serial No. 633,565

2 Claims. (Cl. 47—55)

This invention relates to a method of preserving flowers and also to a method of forming flower corsages in a manner to preserve their freshness.

This invention is also related to a flower corsage or mounting whereby the freshness of the flower is preserved.

It is quite generally known that flowers will last longer if the dehydration of the flower is prevented, as by placing the stems in water either in the absence of nutrient or of preservative materials in the water. It is conventional to place the flower stems in a vase or jar. For corsage purposes, it has been proposed to attach a small container for water to the flower stem. This is both inconvenient and often impracticable. But even when such expedients are used, both when flowers are displayed and when employed in corsages, the degree of protection to the flowers is but limited.

I have found that the preservation of the freshness of the flowers, such as camellias, gardenias, chrysanthemums, roses, and other flowers, may be preserved for a much longer period of time by shortening, and preferably by removing, the stem at substantially the calyx. I then attach to the calyx an absorbent mass, such as a pledget of cotton, or a sponge, blotting paper, etc. or other mass adapted to contain water preferably by absorption. The mass is wetted with water or with a nutrient or preservative solution. The calyx, and particularly the severed portion thereof, is in wet contact with the absorbent mass. The absorbent mass is a reservoir for the water and since it is moist but not a free flowing liquid, it is adapted to formation of corsages. Additionally, the flower so treated may be shipped in ordinary boxes.

The removal of the stem reduces the frictional resistance to the capillary flow of water and nutrient solution into the flower. The stem is the conduit for the transmission of water to the petals, and in the prior art methods acted as a bottleneck to the flow of fluid from the vase or vial in which the flower is set. In my invention the bottleneck is removed and the fluid has ready and unrestricted access to the calyx and the petals.

This invention will be further described in connection with the accompanying drawings which illustrate a preferred embodiment of my invention.

Fig. 1 is a view partly in section, showing the mounting of the flower according to my invention;

Fig. 2 is a bottom plan view;

Fig. 3 is an exploded view of the construction; and

Fig. 4 is a modification of the mounting shown in Fig. 1.

The flower 1 is cut off at the calyx 3 by removal of substantially all of the stem and the stub end of the flower is placed against the absorbent mass, for example, a wad of cotton 4 saturated with water or with nutrient or preservative solution, such as are employed in the preservation of stem flowers. A wire is passed through the cotton and the calyx and the cotton wired to the calyx, leaving a twisted end 5. In order to further decorate the corsage, if this is desired, I form a perforated and slotted disc to which I staple a plurality of, say, four leaves 7 by means of staples 8. The disc is slipped over the wire 5 so that the leaf end 9 is in wet contact with the cotton. The disc is then fixed to the flower by passing a pin through the cotton wad or otherwise attached. A paper or cloth ribbon 10 is then wound around the wire.

As will be seen, both the leaves and the calyx are in wet contact with and attached to the absorbent mass and therefore are fed by the moisture or nutrient or preservative material. In this manner when employing leaves as decoration I preserve the freshness of the leaves as well as the flower.

I may also enclose the absorbent mass, except where it is in contact with the leaves or the calyx, in a coating or envelope to reduce the loss of moisture by evaporation from the cotton mass.

This is illustrated in Fig. 4. The cotton mass is contained in an envelope or container 11 having an opening 12 into which the calyx fits and an opening 13 through which the cotton projects to be in wet contact with the leaves. The wad of cotton is covered by the disc 6. The disc 6 and the container 11 may be made of any material such as paper, but preferably may be made water resistant, as by waxing the paper or treating in any convenient manner by conventional water-proofing media. In this way the loss of moisture from the cotton is inhibited and essentially prevented.

While I have described a particular embodiment of my invention for the purpose of illustration, it should be understood that various modifications and adaptations thereof may be made within the spirit of the invention as set forth in the appended claims.

I claim:

1. A flower corsage mounting, comprising a flower with the stem severed substantially at the calyx, an absorbent mass mounted adjacent and in contact with said severed portion, a wire passing through the absorbent mass and the calyx and having twisted ends, a perforated disc, a plurality of leaves mounted on said disc and disconnected from said flowers, said wire passing through said perforation, and means for attaching said disc with the leaves in contact with said absorbent mass.

2. A flower corsage mounting, comprising a flower with the stem severed substantially at the calyx, an absorbent mass mounted adjacent and in contact with said severed portion, an envelope for said absorbent mass, a wire passing through the absorbent mass and the calyx and having twisted ends, a perforated disc, a plurality of leaves disconnected from said flower and mechanically mounted on said disc, said wire passing through said perforation, and means for attaching said disc with the leaves in contact with said absorbent mass.

ALBERT A. ROBBINS.

REFERENCES CITED

The following references are of record in the file of this patent:

UNITED STATES PATENTS

| Number | Name | Date |
|---|---|---|
| 1,769,198 | Albany | July 1, 1930 |
| 2,350,268 | Zuckerman | May 30, 1944 |
| 2,390,858 | Walker | Dec. 11, 1945 |

OTHER REFERENCES

Publication, S. Leonard Bastin Science and Invention Magazine, August, 1927, page 307.